United States Patent [19]

Yunzhao

[11] Patent Number: 5,167,421
[45] Date of Patent: Dec. 1, 1992

[54] SAFETY SEAT EQUIPPED IN AUTOMOBILE

[76] Inventor: Liu Yunzhao, Building #9, Litangnandiweixiaofushuyiyuan, Binyang County, Guangxi Province, China

[21] Appl. No.: 726,217

[22] Filed: Jul. 5, 1991

[30] Foreign Application Priority Data

Jul. 16, 1990 [CN] China .............................. 90216512.7
Apr. 30, 1991 [CN] China .............................. 91102670.3

[51] Int. Cl.$^5$ .............................................. B60N 2/42
[52] U.S. Cl. ..................................... 297/216; 296/68.1
[58] Field of Search ........................ 297/216; 296/68.1

[56] References Cited

U.S. PATENT DOCUMENTS

| | | | |
|---|---|---|---|
| 2,929,637 | 3/1960 | Papacosta | 296/68.1 X |
| 3,992,046 | 11/1976 | Braess | 296/68.1 |
| 4,396,220 | 8/1983 | Dieckmann et al. | 296/68.1 |
| 4,486,047 | 12/1984 | Nagashima | 296/68.1 |

FOREIGN PATENT DOCUMENTS

| | | |
|---|---|---|
| 882070754 | 3/1989 | China . |
| 892062932 | 12/1989 | China . |
| 2233829 | 1/1975 | France .............................. 296/68.1 |

Primary Examiner—Kenneth J. Dorner
Assistant Examiner—Milton Nelson, Jr.
Attorney, Agent, or Firm—Jacobson, Price, Holman & Stern

[57] ABSTRACT

A safety seat installed in a motor vehicle includes a safety belt, a movable seat and sensors. The movable seat is supported on pipe rails by ball rollers and is locked by a locking device controlled by electromagnetic force. The sensor has two metal elements which are separated from each other. When the motor vehicle collides with an obstruction the two metal elements contact each other and close an electric circuit whereby the locking device will release the seat under the action of an electromagnetic force. The seat is forced to move backward by the action of compressed springs, to prevent the driver and/or passenger on the front seat from being injured by damaging objects penetrating into the cab and/or the front seat.

3 Claims, 3 Drawing Sheets

SAFETY SEAT EQUIPPED IN AUTOMOBILE

BACKGROUND OF THE INVENTION

1. Field of the Invention

The present invention relates to a safety seat installed in a motor vehicle, for example, a truck or a car used by passengers, and particularly to the safety seat in the cab for the motor vehicle driver and/or passengers on the front seats. The safety seat includes a common safety belt, a movable seat and sensors. The movable seat is supported on pipe rails by the means of ball rollers and locked by a locking device which is controlled by electromagnetic force. Each of the sensors comprises two sheets which are arrange to be separated from each other by insulation blocks. Alternatively, the sensors may also include a thin wall metal pipe and a cylindrical metal rod inserted in the thin wall metal pipe, between which there is a gap in which insulation rings are arranged. If the motor vehicle collides with an obstruction, the two metal sheets and/or the thin wall metal pipe and the metal rod of the sensor contact each other to close a circuit. Then the locking device will release the seat under the action of electromagnetic force and the seat will be forced to move backward under the action of compressed springs, thereby preventing the driver and/or passengers on the front seat from injury caused by obstructions penetrating into the cab and/or the front seat due to the collision.

The present invention relates to a safety device for a motor car and particularly to a safety seat installed in a motor car.

When a motor vehicle is in a collision, the main cause of the driver or passenger on the front seat being injured is that damaging objects break into or penetrate into the cab or the front seats, and directly injure the driver or passenger on front seat. Another reason is that, when a motor vehicle stops suddenly because of a collision, the body of the driver or passenger bumps against stationary objects in the front of the motor vehicle and injury occurs because of inertia. For example, when the motor vehicle is in a collision, the driver bumps against the steering wheel and passengers on the front seats bump against the windshield and are injured. Therefore, there have been many devices to prevent a human body from bumping in a forward direction caused by the human body's inertia force.

For example, a safety belt is assembled on the seat to belt the human body onto the seat, and to prevent the human body from being injured by a bump forward under the action of inertia force when the motor vehicle is in a collision. In another method, the steering wheel may be made into a deformable structure to prevent the human body from coming into a rigid collision. In a further method, the surfaces of stationary objects in the motor vehicle may be covered with soft materials to alleviate the harm of a collision. None of these methods can prevent a human body from direct injury caused by various damaging objects breaking into or penetrating into the cab or front seats during a collision.

2. Description of Related Art

Chinese patent 89206293.2 provides a driver's seat which is supported by four wheels on two parallel rails in the shape of ]. A locking device is provided on the rails to lock the seat. A mechanical touching-block is arranged in front of a fender-guard. When the mechanical touching-block is damaged in a crash, the locking device is unlocked by several levers connected with the touching-block to release the seat The seat then moves backward under the action of spring forces or other forces to prevent occupants of the vehicle from being injured. This known safety seat has obvious disadvantages in that the mechanical touching-block of the safety seat can be arranged in only one position, and it is impossible to arrange the mechanical touching-block of the safety seat at every portion of the front of the motor vehicle. Thus, when the motor vehicle is in a crash in bevel side or other portion, the touching-block cannot be contacted to make the seat move backward to prevent the occupants from being injured. Moreover, the mechanical touching-block drives the locking device by means of several levers, and the gap between connecting ends of the levers cannot be avoided, which results in the failure to synchronize the release of the seat with the collision of the motor vehicle. It is also possible that occupants are injured because of delay in the seat being moved back. In addition, the seat is supported by wheels on two parallel rails which are required to be exactly parallel, and any slight inclination of the rails may result in locking of the wheels and prevention of a free backward movement of the seat, thus nullifying the safety feature.

Accordingly, the object of the invention is to provide a safety seat in which a pin is driven to unlock a seat which is secured in position, immediately when a motor vehicle comes into collision, to make the seat move backward. The seat is supported by means of ball rollers on pipe rails, and moves backward reliably without obstruction. Especially, sensors can be arranged at any position at which collision may take place on the front of the motor vehicle, so that, no matter what part of the motor vehicle is in the crash, the seat is able to move backward immediately.

SUMMARY OF THE INVENTION

According to the present invention, there is provided a safety seat including a seat cushion, a seat back, a seat frame, a seat belt, a sensor unit, a seat-cushion-supporting iron plate, a locking device, and a compression spring which is used to urge the seat to move backward. The seat frame includes supporting legs which are integrated with the seat frame and arranged at both sides of the seat frame. The seat frame is movably arranged on two rails which are fixed on the cab floor parallel to the longitudinal direction of the motor vehicle.

The rails are pipe rails. Two steel pipes are fixed on the cab floor parallel to the longitudinal direction of the motor vehicle. Slots, which extend along the longitudinal direction of the steel pipes, are formed respectively in the two sides of the middle portion of each steel pipe. The length of each slot is greater than the sum of the moving distance of the seat and the distance between the two outward sides of the two seat shafts, which is respectively mounted between the supporting legs, of the seat frame, and the width of a slot is greater than the diameter of the seat shaft. The longitudinal axis of the slots in each steel pipe is coincident with the longitudinal axis of the steel pipe.

Two parallel seat shafts are respectively arranged on the front and back supporting legs of the seat frame, and each seat shaft passes through the slots of the steel pipes. Ball rollers are rotatably arranged in the steel pipes respectively to support the seat frame movably on the pipe rails.

Under the seat-cushion-supporting iron plate of the seat frame, a guiding plate, which is parallel to the cushion iron plate and is separated therefrom by a certain distance, is fixed on the seat frame, and a guiding hole is formed in the guiding plate. A pin seat, which extends vertically and is made of magnetic material, is fixed on the guiding plate between the seat-cushion-supporting iron plate and the guiding plate, and the pin seat has a pin seat blind hole extending vertically therefrom. The pin seat blind hole is concentric with the guiding hole in the guiding plate, and a coil W with a metal sleeve is concentrically arranged in the blind hole of the pin seat. A locking spring and a pin are arranged in the metal sleeve and the pin projects therefrom. The vertical section of the pin is in the shape of a T, the larger diameter at the upper end of which corresponds to the interior diameter of the metal sleeve, and the smaller diameter of the lower end of which corresponds to the guiding hole in the guiding plate. The pin can move vertically in the metal sleeve and is made of magnetic material. The coil W is concentrically arranged in the pin seat blind hole, and the locking spring is arranged between the upper end of the pin and the bottom of the pin seat blind hole. A fixed socket is vertically fixed on the socket plate which is fixed on the front ends of the pipe rails. In the socket there is a blind hole which extends vertically, the diameter of which corresponds to the smaller diameter of the lower end of the pin.

The lower end of the pin, having the smaller diameter, is cylindrical, and the corresponding blind hole on the socket is circular and has a diameter corresponding to that of the pin.

The lower end of the pin may also be conical, and the corresponding blind hole in the socket is a conical hole. The conical hole corresponds to the lower end of the pin, having the smaller diameter.

In normal operation, the lower end of the pin extends from the metal sleeve in the blind hole of the pin seat under the action of the locking spring and is inserted for locking in the blind hole of the socket through the guiding hole in the guiding plate. At the same time, the compression spring on the supporting legs of the seat frame is in the compressed state.

The sheet sensors and pipe sensors to be installed are connected in parallel to form the sensor unit; the sheet sensor is made of two pieces of metal sheets which are easy to deform, between which there are a number of small insulation blocks to separate them. The two pieces of metal sheets are taken as two connecting terminals. The pipe sensor is made of a thin wall metal pipe, which is easy to deform, and a metal rod. The metal rod is inserted in the thin wall metal pipe, and there is a gap between the exterior surface of the metal rod and the interior surface of the thin wall metal pipe. A number of insulation rings are put around the metal rod. The metal rod and the thin wall metal pipe are taken as two connecting terminals.

The sheet sensors and/or pipe sensors may be arranged respectively in the front portion and front-side portion of the motor vehicle which are prone to be damaged in a collision (e.g., the front surface or back surface of the front fender-guard and the front and side of the cab).

Sheet sensors and/or pipe sensors are connected in parallel to form sensor unit R, and sensor unit R is connected in parallel with test switch K1 and then connected in series with battery B, coil W and power switch K2.

When the motor vehicle is in a collision, because the sheet sensors and/or pipe sensors are respectively arranged on the portion which is prone to be crashed and there are only several small elastic insulation blocks and/or insulation rings between the two metal sheets of the sheet sensor and/or between the thin wall metal pipe and the metal rod of the pipe sensor, the two metal sheets and/or the thin wall metal pipe and the metal rod will contact each other because of deformation resulting from the collision, thereby closing the circuit whereby coil W generates magnetic force. The magnetic force overcomes the elastic force of the locking spring in the pin seat and the friction between the pin and the metal sleeve and between the pin and the blind hole of the socket to pull the pin out of the socket and draw it back into the pin seat. Therefore, under the action of the pulling force of the compressed springs which are in the front of two sides of the supporting legs of the seat frame, the seat together with the occupant belted therein with a safety belt moves backward, to prevent the occupant from being injured by damaging objects breaking into the cab or penetrating the front seat during the collision. To reset the seat after the seat has moved backward, first the seat is pushed to its original position and then power switch K2 is turned off to cut off the electric current to coil W. The magnetic force terminates and the pin is inserted into the socket again under the action of the locking spring force. A check is made to determine whether the sensors are still in short circuit. If there is a breakdown of the sensors, this is repaired and, finally, the power switch K2 is again turned on. If the checking switch K1 is turned on and the seat can move backward freely again, it means that the safety seat can operate normally.

DETAILED DESCRIPTION OF THE INVENTION

The present invention provides a safety seat for a motor vehicle driver which comprises a seat cushion, a seat back, a seat frame and a seat belt, as are usually equipped in common motor vehicle. The seat frame comprises supporting legs and the supporting legs of the seat frame are supported on pipe rails by two seat shafts and four ball rollers on corresponding seat shafts; the pipe rails are two parallel steel pipes arranged longitudinally, and the ball rollers are respectively arranged in the steel pipes. Slots, which extend along the longitudinal direction of the steel pipes, are provided in the intermediate portion of two sides of the sheet pipes. The length of each slot is greater than the sum of the moving distance of the seat and the distance between the two outer sides of the two seat shafts of the seat frame. The width of each slot is greater than the diameter of the seat shaft and the longitudinal center line of each slot is coincident with the center line of the steel pipe; the two steel pipes are fixed on the cross plate respectively at the upper and lower portion of the front and back end and the lower portion of the middle part of the steel pipes to ensure that they are parallel. A vertical plate is fixed on the front end of each steel pipe. Two steel pipes are fixed on the cab floor of the motor vehicle by means of lower cross plates on two ends of the steel pipe and on the middle portion of the steel pipe. In each supporting leg of the seat frame there is an axle hole; through the axle holes two seat shafts are arranged, parallel to each other, respectively between the front legs and between the back legs of the seat frame. Ball rollers are arranged in the steel pipes. The two seat shafts respectively pass through the slots and the ball rollers to support the seat frame on the pipe rails and enable the seat frame to move freely along the pipe rails. A crossbeam is fixed in front of the supporting legs of the seat frame. A compression spring is respectively arranged between the crossbeam and each vertical plate fixed on a steel pipe of the pipe rails. Under the seat-cushion- supporting iron plate of the seat frame, a guiding plate is fixed on the seat frame, which is parallel to and separated from the seat-cushion-supporting iron plate by a certain distance. A guiding hole is formed in the guiding plate, and a vertically extending pin seat made of carbon steel is fixed between the guiding plate and the seat-cushion-supporting iron plate of the seat frame. The pin seat has a vertically extending blind hole, and the blind hole is concentric with the guiding hole in the guiding plate, the diameter of which is smaller than that of the blind hole. A coil W is vertically arranged in the blind hole of the pin seat, and a metal sleeve is concentrically arranged in the coil W. A locking spring and a pin which can move axially and is made of carbon steel and whose vertical section is in the shape of a T are arranged in the metal sleeve. The pin has a upper cylindrical portion and a lower cylindrical portion which have different diameters. The diameter of the upper portion of the pin corresponds to the inner diameter of the metal sleeve in the pin seat, and the diameter of the lower portion of the pin corresponds to the diameter of the guiding hole through the guiding plate. The locking spring is arranged between the top surface of the upper portion, having the larger diameter, of the pin and the bottom of the blind hole of the pin seat. A socket is vertically fixed at a proper position on the socket plate which is fixed on the front portion of the two steel pipes. In the socket there is a blind hole which extends axially and upward, and the diameter and length of the blind hole correspond to those of the lower portion, having the smaller diameter, of the pin.

Under the action of the locking spring force, the lower portion of the pin extends out from the guiding hole in the guiding plate and is inserted into the blind hole of the socket, whereby the safety seat is in its normal position for use.

There is a coil W in the pin seat. The coil W is serially connected with a power switch K2, a sensor unit R and a battery. The sensor unit R may comprise many sensors R1, R2, ... connected in parallel. A checking switch K1 is connected in parallel with the sensor unit R. The sensor may be a sheet sensor or a pipe sensor. The sensor unit R may include several sheet sensors together with several pipe sensors by means of parallel connection. In practice, the type of the sensor may be arbitrarily selected according to the installation requirements, particularly depending on the position where the sensors are to be installed. A sheet sensor is made by positioning several rubber (or foam plastic) insulation blocks between two pieces of metal sheets and then using plastic strips to wrap the two pieces of metal sheets. The two metal sheets are used as the two connecting terminals. A pipe sensor is made by inserting a metal rod with several insulation rings into a thin wall metal pipe (e.g. an aluminum pipe). The length of the metal rod corresponds to that of the thin wall metal pipe and there is a gap between the thin wall metal pipe and the metal rod. The metal rod and the thin wall metal pipe are used as the two connecting terminals. The checking switch K1 and several sheet sensors and/or pipe sensors are connected in parallel, and then serially connected with the battery B, the power switch K2, and the coil W. The quantity of the two kinds of sensors may be changed to be suitable for use in any kind of motor vehicle and may be installed at any portion of a motor vehicle.

In normal operation, the power switch K2 is turned on while the thin metal sheets or the thin wall metal pipe and the metal rod are separated with insulation blocks or rings, and therefore there is no current through coil W. Under the action of the locking spring force, the lower portion of the pin extends out from the metal sleeve end, passing through the guiding hole in the guiding plate and being inserted into the blind hole of the socket. At the same time, the two compression springs in front of the seat frame are compressed. As soon as the motor vehicle is in a crash, the sensor R is compressed and deformed and the circuit is closed, thereby providing a current to coil W to generate magnetic force. The magnetic force pulls out the pin from the blind hole of the socket and draws it back into the metal sleeve of the blind hole of the pin seat, whereby the seat frame is released. Then the compressed spring in front of the supporting legs of the seat frame will push the entire seat backward, together with the occupant belted thereon with a safety belt, immediately, which prevents the occupant from being injured by damaging objects.

The preferred embodiments of the present invention are hereinafter detailed by reference to the drawings.

DESCRIPTION OF THE PREFERRED EMBODIMENTS

Figure 1:
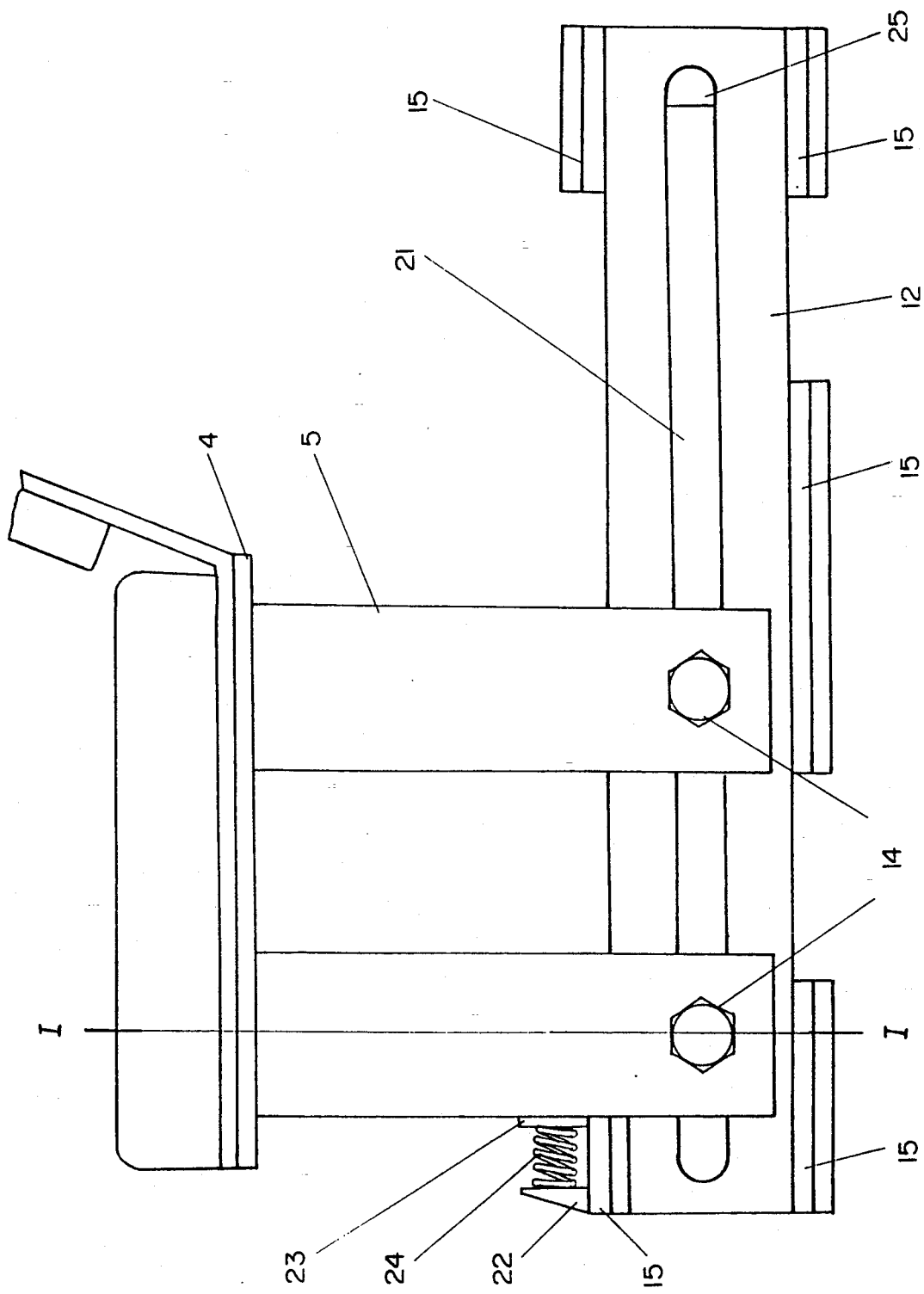
FIG. 1 is a schematic side view of a safety seat for a motor vehicle driver, showing a preferred embodiment of the present invention.
Figure 2:
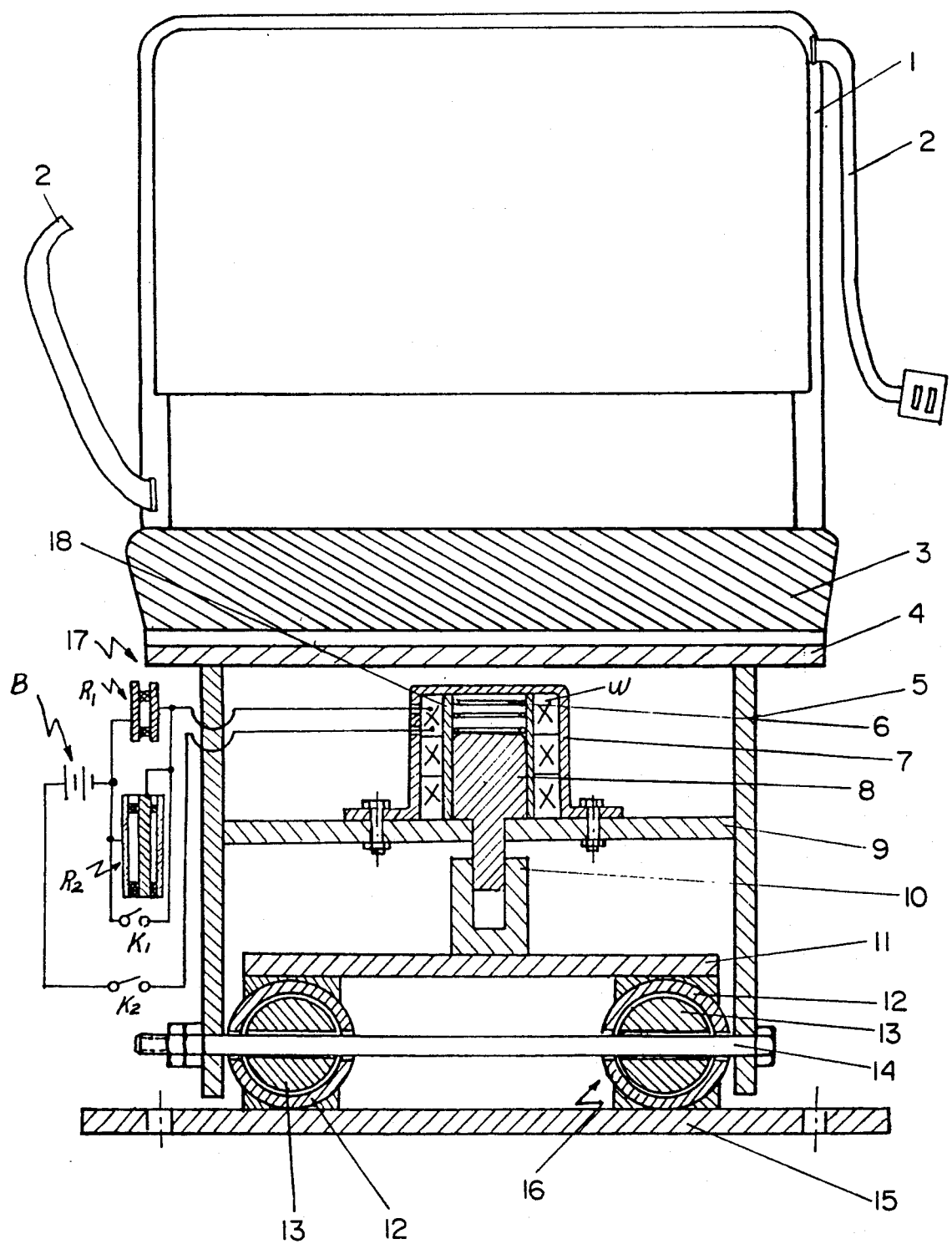
FIG. 2 is a schematic sectional view taken along line I—I of FIG. 1, including a schematic view of the electric circuit of the sensor unit.
Figure 3:
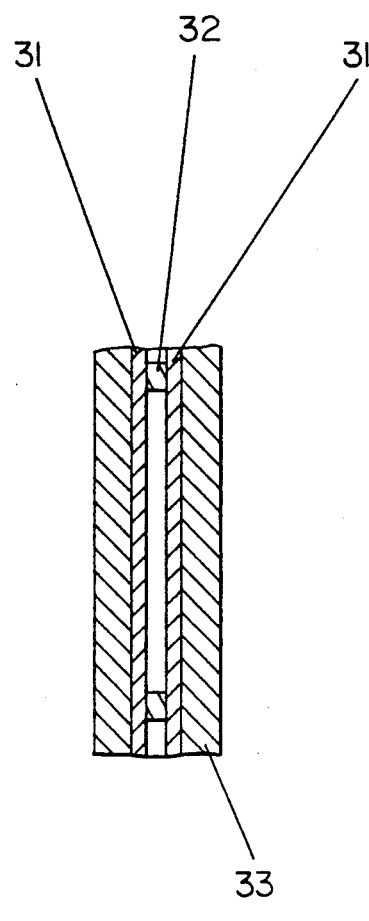
FIG. 3 is a cross-sectional view of a sheet sensor.
Figure 5:
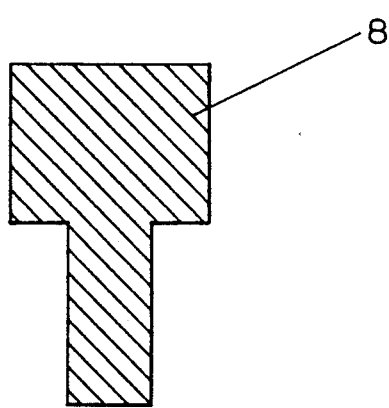
FIG. 5 is a cross-sectional view of a pin.

FIG. 1 and FIG. 2 are respectively a side view and a sectional view of a safety seat for a motor vehicle driver, which also shows a diagrammatic view of an electric circuit for the sensor unit. A safety seat for a motor vehicle driver according to the present invention comprises a seat cushion 3, a seat cushion-supporting iron plate 4, a seat back 1, a seat frame 17 and a seat belt 2, which are usual equipment in a common motor vehicle. The seat frame 17 comprises supporting legs 5 and these supporting legs 5 of the seat frame 17 are supported on pipe rails 16 by means of two seat shafts 14 with four ball rollers 13. The pipe rails 16 are two longitudinally parallel steel pipes 12 and the ball rollers 13 are respectively arranged in the steel pipes 12. Slots 21, which extend along the longitudinal direction of the steel pipes 12, are formed in an intermediate portion of each side of each pipe. The length of each slot 21 is greater than the sum of the moving distance of the seat and the distance between the two outward sides of the two seat shafts 14, mounted respectively on the front portion of the supporting legs and the back portion of the supporting legs at a right angle to the pipe rails. The width of a slot is greater than the diameter of a seat shaft 14. The longitudinal axis of the slots in the steel pipe is coincident with the longitudinal axis of the steel pipe 12. A collision-proof block 25 is arranged at the rearward end of slot 21. Four cross plates 15 are provided respectively at the upper and lower portion of the front and back end and on the lower portion of the middle part of the steel pipes 12, and pipes 12 are fixed on these cross plates 15 to make them parallel. A vertical plate 22 is fixed on the front end of each steel pipe 12. Two steel pipes 12 are fixed on the cab floor of the motor vehicle by means of three cross plates 15 at two ends and the middle portion of the steel pipe. On each supporting leg on the seat frame there is an axle hole in which two seat shafts 14 are arranged in parallel through supporting legs 5. Ball rollers 13 are arranged in the steel pipes 12. The two seat shafts 14 respectively pass through slot 21 in the steel pipes 12 and ball rollers 13 to support the seat frame 17 on the pipe rails 16 and enable it to move freely on the pipe rails 16. A crossbeam 23 is fixed at the front side of the supporting legs 5 of the seat frame 17. Compression springs 24 are respectively arranged between the crossbeam 23 and each vertical plate 22 fixed on the steel pipe 12 of the pipe rails. Under the seat-cushion- supporting iron plate 4 of the seat frame 17 a guiding plate 9 is fixed to the seat frame 17, which is parallel to and separated from the seat-cushion-supporting-iron plate 4 by a fixed distance. A guiding hole is formed in the guiding plate 9, and a vertically extending pin seat 7 made of carbon steel is fixed between the guiding plate 9 and the seat-cushion-supporting-iron plate 4 of the seat frame 17. The pin seat 7 has a vertically extending blind hole, and the blind hole is concentric with the guiding hole in the guiding plate 9, the diameter of which is smaller than that of the blind hole of the pin seat. A coil W is vertically arranged in the blind hole of the pin seat 7, and a metal sleeve 18 is concentrically arranged in the coil W. A locking spring 6 and a pin 8 are arranged in the metal sleeve 18, and the pin 8 can move vertically and is made of carbon steel. The vertical section of pin 8 is T-shaped. The pin 8 has an upper cylindrical portion and a lower cylindrical portion which have different diameters (as shown in detail in FIG. 5). The diameter of the upper cylindrical portion of the pin 8 correspond to the inner diameter of metal sleeve 18 in the pin seat 7, and the diameter of the lower cylindrical portion corresponds to the diameter of the guiding hole in the guiding plate 9. The locking spring 6 is arranged between the top end of the pin 8 and the bottom surface of the blind hole of the pin seat 7. A socket 10 is vertically fixed at a proper position on the socket plate 11 on the front portion of the two steel pipes 12 and there is a blind hole which extends vertically and upward in the socket 10. The diameter and length of the blind hole of the socket corresponds to those of the lower end of the pin 8. Under the action of the locking spring force, the lower cylindrical portion of pin 8 extends out from the guiding hole in guiding plate 9 and is inserted into the blind hole of the socket 10. Thus, the safety seat is locked in its normal position for use.

Figure 4:
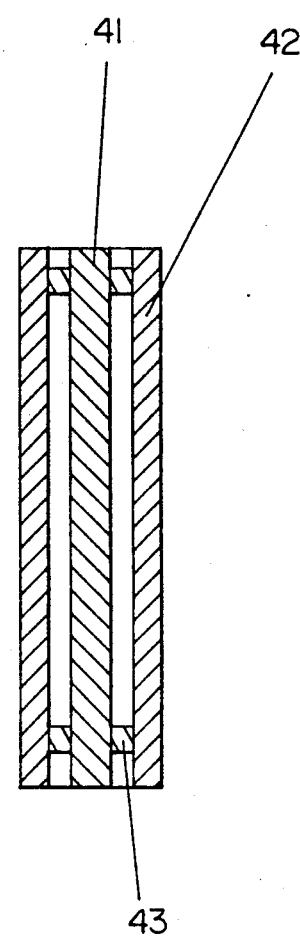
FIG. 4 is a cross-sectional view of a pipe sensor.

Coil W in poin seat 7 is connected in series with a power switch K2, a sensor unit R and a battery B. The sensor unit R may be comprised of several sensors R1, R2 . . . by means of parallel connection and the sensor may be a sheet sensor R1 or a pipe sensor R2. Several sheet sensors and several pipe sensors may comprise the sensor unit R. In practice, the type of sensor may be arbitrarily selected according to the installation requirements, particularly depending on the position where the sensors are to be installed. A sheet sensor is made by positioning a number of rubber (or foam plastic) insulation blocks 32 between two pieces of metal sheets 31, and then using plastic strips 33 to fasten the two pieces of metal sheets 31. The two metal sheets 31 form two connecting terminals. A pipe sensor is made by inserting a metal rod 41 with insulation rings 43 into a thin wall metal pipe 42 (e.g., an aluminum pipe), as shown in FIG. 4. The length of the metal rod 41 corresponds to that of the thin wall metal pipe 42 and there is a gap between the wall of thin wall metal pipe and the metal rod. The metal rod 41 and the thin wall metal pipe 42 are respectively used as two connecting terminals. Several sheet sensors and/or pipe sensors are connected in parallel, and then connected in parallel with the checking switch K1, and then serially connected with the battery B, the power switch K2 and the coil W. The length of the two types of sensors may change arbitrarily to be suitable for use in any kind of motor vehicles, and for installation at any portion of a motor vehicle.

In the normal operating position, the power switch K2 is turned on while the checking switch K1 is turned off. The thin metal sheets 31 and/or the thin wall metal pipe 42 and the metal rod 41 are separated with insulation blocks 32 and/or insulation rings 43, and there is no current through coil W. Therefore, under the action of the locking spring force the pin 8 extends out from the metal sleeve 18 with its lower cylindrical portion passing through the guiding hole in the guiding plate and being inserted into the blind hole of the socket, and at the same time the two compression springs 24 in front of the seat frame 17 are in compressed state. Upon the occurrence of a collision, the sensor unit R is compressed and deformed and the circuit is closed to provide an electric current to coil W to generate magnetic force. The magnetic force pulls the pin 8 out from the blind hole of the socket and draws it back into the metal sleeve 18 in the pin seat 7. Thus, the seat frame 17 is released and the compressed springs 24 in front of the supporting legs 5 of the seat frame push the entire seat backward, together with the occupant belted thereon with a safety belt, immediately, thereby preventing the occupant from being injured by damaging objects.

Figure 6:
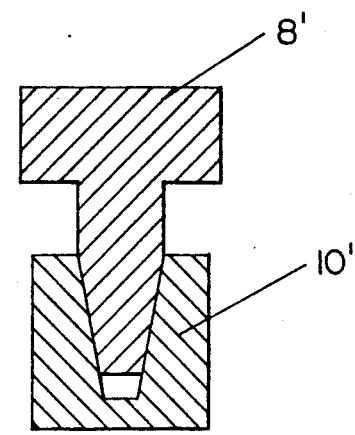
FIG. 6 is a cross-sectional view indicating the fitting between a pin having a conical end and the socket.

The safety seat installed in a motor vehicle of the second embodiment of the present invention is similar to the first embodiment. The difference is only that the lower portion of the pin 8' (as shown in FIG. 6) is conical in section and the blind hole into which the pin 8' of the socket 10' fits is a conical hole.

The third embodiment of the present invention is similar to the first embodiment. The difference is only that the sensor unit is completely comprised of pipe sensors connected in parallel.

I claim:

1. A safety seat installed in a motor vehicle comprising a seat cushion, a seat back, a seat frame, a seat belt, a sensor unit, a seat cushion-supporting-iron plate, a locking device and compression springs used to move the seat backward, said seat frame having supporting legs attached to said seat frame and arranged on each side of said seat frame, said seat frame being movably arranged on a pair of rails fixed on the vehicle floor parallel to the longitudinal direction of the motor vehicle, wherein:

said rails are pipe rails comprising steel pipes fixed on the vehicle floor and parallel to the longitudinal direction of the motor vehicle; said pipes each comprise slots extending along the longitudinal direction of each of said steel pipes, formed in each side of an intermediate portion of each said steel pipe, the length of each said slot being greater than the sum of the moving distance of said seat and the distance between outer sides of two parallel seat shafts of said seat frame, the width of each said slot being greater than the diameter of each said seat shaft; the longitudinal axis of each said slot in each steel pipe being coincident with the longitudinal axis of the steel pipe;

said two parallel seat shafts are respectively arranged on the supporting legs of said seat frame, and each seat shaft passes through said slots of said steel pipes perpendicular to the longitudinal axis of the pipe, and ball rollers movably arranged in said steel pipes, movably supporting said seat frame on said pipe rails;

under the seat-cushion-supporting-iron plate of said seat frame, a guiding plate parallel to said seat-cushion-supporting iron plate, separated therefrom by a fixed distance, is secured to said seat frame; a guiding hole is formed in said guiding plate; a pin seat, extending vertically and made of magnetic material, is fixed on the guiding plate and between the seat-cushion-supporting iron plate and the guiding plate, said pin seat having a blind hole extending vertically; the blind hole of the pin seat being concentric with the guiding hole in the guiding plate; wherein a coil W is vertically arranged in the blind hole of the pin seat, a metal sleeve is concentrically arranged inside coil W, and a locking spring and a pin are arranged in said metal sleeve; the vertical section of said pin is T-shaped, wherein the upper portion thereof has a larger diameter corresponding to an interior diameter of said metal sleeve, and the lower portion thereof has a smaller diameter corresponding to a diameter of said guiding hole in said guiding plate, and the pin can move vertically and reciprocally in said metal sleeve and is made of magnetic material; said locking spring is arranged between the upper portion of said pin and the bottom of said pin seat blind hole; a fixed socket is vertically secured to a socket plate which is fixed at the front portion of said rail, and said socket comprises a blind hole extending vertically upward, wherein the diameter of said blind hole corresponds to the diameter of the lower portion of said pin;

wherein in normal operation, the lower portion of said pin extends out from the metal sleeve into said blind hole of said pin seat under the action of the locking spring, and is inserted into the blind hole of said socket through the guiding hole in said guiding plate to be locked and, at the same time, a compression spring in front of the supporting legs of said seat frame is in a compressed state;

sheet sensors and pipe sensors are connected in parallel to form said sensor unit; said sheet sensor is made of two easily deformable metal sheets between which there are a plurality of insulation blocks for separation thereof, and said metal sheets comprise two connecting terminals respectively; said pipe sensor is made of an easily deformable thin wall metal pipe and a metal rod, said metal rod is arranged in the thin wall metal pipe wherein there is a gap between the exterior surface of said metal rod and the interior surface of said thin wall metal pipe and a plurality of insulation rings extend around said metal rod, wherein said metal rod and said thin wall metal pipe comprise two connecting terminals;

wherein said sensors are arranged on the front portion and front-side portion of a motor vehicle;

wherein a plurality of said sensors are connected in parallel to form a sensor unit R, and said sensor unit R is connected in parallel with checking switch K1 and serially connected with battery B, coil W and power switch K2.

2. A safety seat installed in a motor vehicle as claimed in claim 1 wherein the lower portion of said pin is of conical shape and the corresponding blind hole of said socket is a conical hole, shaped correspondingly to the lower portion of said pin.

3. A safety seat installed in a motor vehicle as claimed in claim 1 wherein said sensor unit comprises pipe sensors connected in parallel.

* * * * *